L. M. ASPINWALL.
STEERING GEAR FOR TORPEDOES.
APPLICATION FILED MAY 15, 1919.
1,360,258.
Patented Nov. 30, 1920.
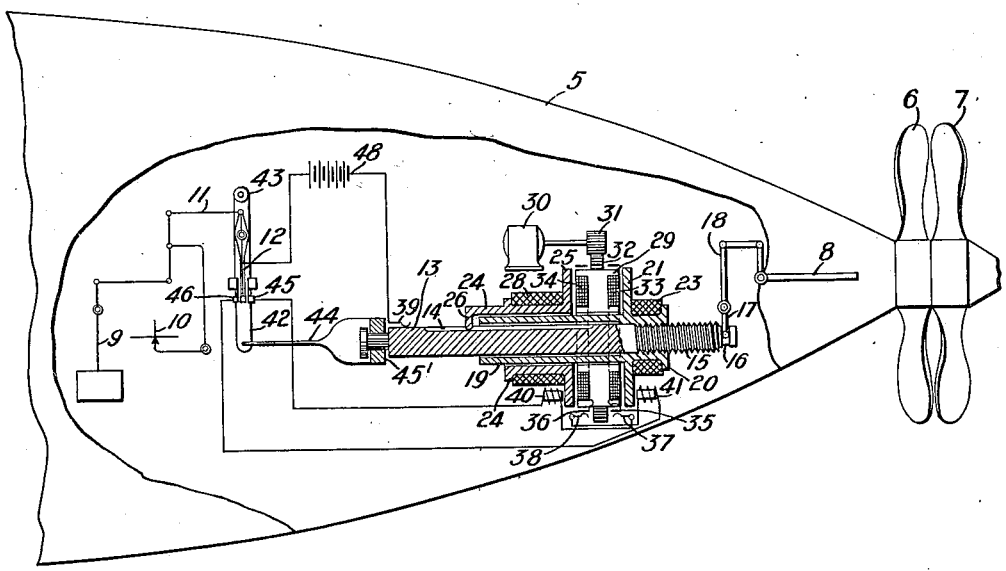
WITNESSES:
H. J. Shelhamer
D. C. Davis
INVENTOR
Louis M. Aspinwall
BY
Wesley J. Carr
ATTORNEY

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

STEERING-GEAR FOR TORPEDOES.

1,360,258.     Specification of Letters Patent.     Patented Nov. 30, 1920.

Application filed May 15, 1919. Serial No. 297,338.

*To all whom it may concern:*

Be it known that I, LOUIS M. ASPINWALL, a citizen of the United States, and a resident of Pittsburgh, in the county of Allegheny, and State of Pennsylvania, have invented a new and useful Improvement in Steering-Gears for Torpedoes, of which the following is a specification.

My invention relates to automatic steering systems for automotive devices, such as self-propelled torpedoes, and it has for its object to provide apparatus of the character designated that shall be rugged and effective in action, particularly in that it shall provide a positive impulse of the desired magnitude for the rudder while deriving a minimum amount of energy from the regulating device sensitive to deviations of the automotive body from the desired course.

More broadly, my invention comprises the provision of apparatus whereby a relatively large, heavy controlled member of any desired nature and for the performance of any desired function is caused to follow closely, in its movements, a small, light controlling member, with the abstraction of relatively little energy therefrom. This mechanism is susceptible of a wide variety of modifications in construction and use.

The single figure of the accompanying drawing is a side view, partially in section and partially in elevation, of the after-body of a torpedo and showing a steering system embodying my invention in diagrammatic form.

In the control of torpedoes and similar automotive bodies, it is usual to employ relatively delicate regulating devices, such as gyroscopes, pendulums and pressure-diaphragms for indicating the deviation of the control body from the desired course. A derivation of any appreciable amount of energy from a device of this character seriously impairs the sensitiveness thereof and, as this error is cumulative, it gradually leads to the assumption of a wrong course by the controlled body.

I find that a delicate regulating device, such as the combined pendulum and pressure-diaphragm employed for the vertical steering of a torpedo, may well be employed for closing the one or the other of two control circuits, these control circuits being operated to energize the one or the other of two magnetic clutches employed to actuate a rudder from a continuously driven shaft. By this means, ready adjustment of the rudder is effected, with the derivation of substantially no energy from the regulating device. Other features of my invention will hereinafter more fully appear.

Referring to the drawing, I show the after-body of a torpedo at 5, the torpedo being provided with the usual oppositely rotating propellers 6 and 7 for the propulsion thereof and with a horizontally disposed rudder 8 for the regulation of the depth.

The control of the rudder 8 is effected by sensitive regulating apparatus of any desired and well known form embodying a pendulum 9, responsive to deviations of the torpedo from an even keel, and a depth diaphragm 10 responsive to deviations from the desired depth, even on an even keel. The devices 9 and 10 are connected through a suitable linkage mechanism 11, adapted to combine and magnify the indications thereof, to produce oscillating movement of a contact member 12 in one direction when the torpedo tends to go too deep and in the other direction when the torpedo tends to run too near the water surface. The movement of the contact member 12 controls energizing circuits for the adjustment of the rudder position as follows.

A central shaft 13 is provided having a keyway 14, a threaded portion 15 and an annular groove 16. A yoke member 17 embraces the groove 16 and is connected to the rudder 8 through a linkage 18, so that longitudinal movement of the shaft 13 adjusts the rudder position. A sleeve 19 loosely surrounds the shaft 13 and is provided with a portion 20 in threaded engagement with the threaded portion 15 of the shaft. The sleeve 19 further bears a magnetizable disk 21 and is prevented from longitudinal movement by engagement with a bearing bushing 23, this latter engagement, however, permitting free rotation of the sleeve 19, together with the disk 21.

In like manner, the shaft 13 is loosely surrounded by a sleeve 24 carrying a magnetizable disk 25, a feather 26 engaging in the keyway 14 and rotatably mounted in a bearing bushing 28 to prevent the longitudinal movement of this sleeve member.

A composite clutch ring 29 is mounted to rotate freely between the disks 21 and 25 and is continuously driven, as by a motor 30 having a pinion 31 engaging teeth 32 surrounding the periphery of the member 29.

The member 29 is formed of magnetizable material and one face may be magnetized by a suitable winding 33 and the other face may be similarly magnetized by a suitable winding 34. The windings 33 and 34 are energized, respectively, from slip rings 35 and 36 through brushes 37 and 38, the circuits being completed through the shaft 13 and a suitable brush 39 bearing thereupon. A small electromagnetic brake 40 is disposed adjacent the disk 25, and a similar brake 41 is disposed adjacent the disk 21.

The oscillating member 12 is pivotally mounted upon a swinging frame 22 pivoted at 43. The lower end of the frame 42 is joined by a link 44 to a collar 45' riding in a groove in the shaft 13, so that longitudinal movement of this shaft swings the frame 42. The contact member 12 oscillates between two contact members 45 and 46 mounted on the frame 42. The contact member 12 is connected to one pole of a current source 48, the other terminal of which is connected to the shaft 13, as through a brush 39. The contact members 45 and 46 are connected, respectively, through the brake magnets 40 and 41, to the clutch coils 33 and 34.

When the member 12 is in contact with the member 46, current flows from the source 48 through the brake 41, the clutch coil 34 and back to the source and, likewise, when the member 12 is in contact with the member 45, current flows through the braking coil 40 and the clutch coil 43 to the source.

Having thus described the arrangement of a system embodying my invention, the operation thereof is as follows. Assume that the torpedo is operating at the desired depth on an even keel. The contact member 12 is at an intermediate position and, similarly, the shaft 13 is at an intermediate position so that the rudder 8 is at mid-position, as shown.

Let it now be assumed that the torpedo tends to ascend to too small a depth, either by pointing the nose upward or by rising on an even keel. The contact member 12 is moved forwardly to engage the contact member 46. Current flows from the source 48 through the member 12 and brush 46 to energize the brake 41 and the clutch coil 34. The brake 41 firmly grips the disk 21 and prevents the same from rotation, and the disk 25 is thrown into engagement with the forward face of the member 29 for rotation therewith, as by the motor 30, or the member 29 may be driven from the main propeller shaft, if desired. The engagement of the feather 26 in the keyway 14 causes the rotation of the shaft 13 with the disk 25 and the sleeve 24, and the threaded portion 15 of the shaft 13 is caused to turn relative to the coacting threaded portion 20 of the sleeve 19. As the latter sleeve is prevented from longitudinal movement by the bearing 23, the shaft 13 must move forwardly, depressing the rudder 8 and restoring the torpedo to its normal position. The restoration of the torpedo to its proper depth position moves the contact member 12 backwardly until it is out of contact, thus de-energizing the aforementioned circuit. A similar result is secured by the forward movement of the frame 42 caused by the connection with the shaft 13.

Conversely, if the torpedo tends to sink, either by tilting the nose downwardly or by descending on an even keel, the contact member 12 is moved backwardly into engagement with the member 45 and current flows from the source 48 through the brake coil 40 and the clutch coil 33, the brake 40 positively engaging the disk 25 to restrain it from rotation, and the energization of the coil 33 drawing the disk 21 into firm engagement with the rear face of the driving member 29. The shaft 13 is prevented from rotation because of its key-and-feather engagement with the locked sleeve 24, and the rotation of the disk 21 with the driving member 29 causes relative movement of the threaded portion 20 upon the threaded portion 15. Since the member 29 rotates in the same direction as before, it follows that the shaft 13 is moved longitudinally in the opposite direction, the sleeve 19 being prevented from longitudinal movement by engagement with the member 23. Thus, the rudder 8 is turned upwardly to properly correct the depth of the torpedo.

Particular attention is directed to the fact that, by the system disclosed, positive and absolute locking of either the disk 21 or the disk 25 is secured when the other disk is being rotated, as required for the exact operation of the device, but, in many cases, I find that it is unnecessary to employ the electro-responsive brakes 40 and 41, it being sufficient to employ merely friction brakes bearing at all times on the disks or to rely solely upon the friction of the bearing members of the respective disks and sleeves.

While I have shown my invention as applied to the control of the vertical steering of a torpedo, obviously the same general system may be employed for the adjustment of a vertically disposed rudder, as employed in horizontal steering, a gyroscope or equivalent regulating device being employed in lieu of the devices 9 and 10.

Still other applications of the clutch shown and described will occur to workers with this form of apparatus, as it enables a member to be operated in either direction from a continuously operating driving member, the selective action being exercised in a simple and effective manner from any desired distance and with a minimum of simplicity and freedom from friction in the transmitting apparatus.

Particular attention is directed to the close manner in which the shaft 13 may be caused to follow the movements of the member 12 by the above described mechanism. A forward movement of the member 12 is followed by a like forward movement of the shaft 13 and vice versa, the movement of the shaft 13, together with the adjustment of relatively heavy control apparatus, abstracting substantially no energy from the member 12, thus leaving the latter perfectly free to be subject to its movements about its sensitive control elements.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a selective clutch mechanism, the combination of a continuously driven rotating member, a shaft projecting loosely therethrough and provided with a threaded portion and with a key-way, two sleeves loosely mounted upon said shaft, one being in threaded engagement with said threaded portion and the other having a feather engaging in said key-way, means for preventing longitudinal movement of said sleeves, two disks one of which is mounted on each of said sleeves, respectively, said disks being disposed on opposite sides of said rotating member and in proximity thereto, and means operative to cause one or the other of said disks to engage with said rotating member.

2. In a steering mechanism, for an automotive body, the combination with a steering member for causing said body to alter its course, of a continuously driven rotating member, a shaft projecting loosely therethrough and provided with a threaded portion and with a key-way, two sleeves loosely mounted upon said shaft, one being in threaded engagement with said threaded portion and the other having a feather engaging in said key-way, means for preventing longitudinal movement of said sleeves, two disks one of which is mounted on each of said sleeves, respectively, said disks being disposed on opposite sides of said rotating member and in proximity thereto, coupling members whereby longitudinal movement of said shaft adjusts said steering member, and a control device operative to cause one or the other of said disks to engage with said rotating member to adjust said steering member.

3. In a selective clutch mechanism, the combination of a continuously driven rotating member, a shaft projecting loosely therethrough and provided with a threaded portion and with a key-way, two sleeves loosely mounted upon said shaft, one being in threaded engagement with said threaded portion and the other having a feather engaging in said key-way, means for preventing longitudinal movement of said sleeves, two disks, one of which is mounted on each of said sleeves, respectively, said disks being disposed on opposite sides of said rotating member and in proximity thereto, means operative to cause one or the other of said disks to engage with said rotating member, and means whereby either disk is locked against rotation when the other disk is being rotated.

4. In a steering mechanism for an automotive body, the combination with a steering member for causing said body to alter its course, of a continuously driven rotating member, a shaft projecting loosely therethrough and provided with a threaded portion and with a key-way, two sleeves loosely mounted upon said shaft, one being in threaded engagement with said threaded portion and the other having a feather engaging in said key-way, means for preventing longitudinal movement of said sleeves, two disks, one of which is mounted on each of said sleeves, respectively, said disks being disposed on opposite sides of said rotating member and in proximity thereto, coupling members whereby longitudinal movement of said shaft adjusts said steering member, a control device operative to cause one or the other of said disks to engage with said rotating member to adjust said steering member, and means whereby either disk is locked against rotation when the other disk is being rotated.

5. In a steering mechanism for an automotive body, the combination with a steering member for causing said body to alter its course, of a power mechanism for operating said steering member in one direction or the other, electrically-controlled selective means for controlling the direction of operation of said power-operated steering member, a pair of circuit-terminals for controlling one or the other of said selective means, a movable circuit-terminal operable to effect a circuit closure with one or the other of said pair of circuit-terminals to energize one or the other of said selective means, a directive device for moving said movable circuit terminal in accordance with the movements which it is desired to impart to said steering member, and means responsive to the imparted movements of said steering member for moving said pair of circuit-terminals in a direction tending to open said circuit closure.

In testimony whereof, I have hereunto subscribed my name this 26th day of April, 1919.

LOUIS M. ASPINWALL.